US012279349B2

United States Patent
(12) United States Patent
Peng

(10) Patent No.: US 12,279,349 B2
(45) **Date of Patent: *Apr. 15, 2025**

(54) LED STRING CONTROL SYSTEM, LED MODULES, AND METHOD OF CONTROLLING THE SAME

(71) Applicant: SEMISILICON TECHNOLOGY CORP., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 209 days.

This patent is subject to a terminal disclaimer.

(21) Appl. No.: 18/085,808

(22) Filed: Dec. 21, 2022

(65) Prior Publication Data

US 2023/0389158 A1 Nov. 30, 2023

Related U.S. Application Data

(63) Continuation-in-part of application No. 17/827,551, filed on May 27, 2022, now Pat. No. 11,968,758.

(51) Int. Cl.
*H05B 45/52* (2020.01)
*H05B 45/34* (2020.01)

(52) U.S. Cl.
CPC ............. *H05B 45/52* (2020.01); *H05B 45/34* (2020.01)

(58) Field of Classification Search
CPC ...... H05B 45/52; H05B 45/34; H05B 47/185; H05B 45/32–335
See application file for complete search history.

(56) References Cited

U.S. PATENT DOCUMENTS

| | | | | |
|---|---|---|---|---|
| 11,277,895 B1 * | 3/2022 | Salam | ................ | H05B 45/3725 |
| 11,672,061 B1 * | 6/2023 | Peng | .................... | H05B 45/325 315/185 R |
| 11,968,758 B2 * | 4/2024 | Peng | ...................... | H05B 45/44 |

* cited by examiner

*Primary Examiner* — Renan Luque
(74) *Attorney, Agent, or Firm* — MUNCY, GEISSLER, OLDS & LOWE, P.C.

(57) ABSTRACT

An LED string control system includes an LED string and a control module. The control module provides a first voltage level according to a first digital logic of a light command, and provides a second voltage level according to a second digital logic of the light command to form a control signal. Based on consecutive first digital logics and/or second digital logics of the light command, the control module adjusts a voltage level of the control signal to a third voltage level as a distinction voltage level for distinguishing two consecutive first digital logics and/or two consecutive second digital logics.

13 Claims, 14 Drawing Sheets

LED STRING CONTROL SYSTEM, LED MODULES, AND METHOD OF CONTROLLING THE SAME

CROSS-REFERENCE TO RELATED APPLICATION

This application is a Continuation-in-Part application of U.S. patent application Ser. No. 17/827,551, filed on May 27, 2022, and entitled "LED LIGHT STRING CONTROL SYSTEM AND METHOD OF CONTROLLING THE SAME". The entire disclosures of the above application are all incorporated herein by reference.

BACKGROUND

Technical Field

The present disclosure relates to a light emitting diode (LED) string control system, LED modules, and a method of controlling the same, and more particularly to an LED string control system with signal identification function, LED modules, and a method of controlling the same.

Description of Related Art

The statements in this section merely provide background information related to the present disclosure and do not necessarily constitute prior art.

Since the application of light emitting diodes (LEDs) is becoming more and more popular, and the manufacturing cost thereof is also getting lower and lower, the application of LEDs in lighting or display is becoming more and more extensive. Correspondingly, there are more and more operation and control methods for the lighting behavior of LEDs. In the application of LED strings, since the previous technology only uses the time width to determine whether the digital logic is "0" or "1", the disadvantage is that in the LED string, the number of lights, the length of the distance between the lights, and the thickness of the wire diameter of the light string will affect the parasitic capacitive reactance in the LED string. If the parasitic capacitance is too large, the square wave waveform of "0" and "1" will be distorted.

It is assumed that the square-wave waveform of "0" and "1" should last for 1 μs under ideal conditions, and the LED string needs to last at least 0.8 μs to identify this signal as "0" or "1". However, due to the distortion by influence of too large parasitic capacitance, the square-wave waveform with logic "0" is only 0.5 μs. Therefore, if the square-wave waveform is distorted, only using the time width to determine the digital logic may easily lead to insufficient time width and misjudgment, which in turn leads to the situation that the LED string cannot be controlled.

SUMMARY

An object of the present disclosure is to provide a light emitting diode (LED) string control system with signal identification function to solve problems of the existing technology. The LED string control system includes an LED string and a control module. The LED string incudes a plurality of LED modules. The control module is coupled to the LED modules, and provides a control signal to control the LED modules to generate lighting behavior based on a light command. The light command is composed of a plurality of first digital logics and a plurality of second digital logics in a specific sequence; the control module respectively provides a plurality of first voltage levels and a plurality of second voltage levels to form the control signal based on the first digital logics and the second digital logics of the light command. When the light command includes the first digital logics and the second digital logics interlaced to each other, the control module directly adjusts the voltage level of the control signal from the first voltage level to the second voltage level or from the second voltage level to the first voltage level based on the interlaced sequence. When the light command includes consecutive first digital logics and/or consecutive second digital logics, the control module provides a third voltage level as a distinction voltage level for distinguishing two consecutive first voltage levels and/or two consecutive second voltage levels.

Another object of the present disclosure is to provide an LED module. The LED module receives a control signal including a plurality of first voltage levels and a plurality of second voltage levels. The LED module includes an LED controller and at least one LED. The LED controller receives an input voltage required for operation through a positive end and a negative end, and receives the control signal through a signal-receiving end. The at least one LED is coupled to the LED controller. The control signal is composed according to a specific sequence, and includes a first voltage level with direct change in voltage level and a second voltage level with direct change in voltage, and a distinction voltage level for distinguishing two consecutive first voltage levels and/or two consecutive second voltage levels; when two consecutive first voltage levels and/or two consecutive second voltage levels are distinguished by the distinction voltage level, the LED controller correspondingly generates a drive command according to the first voltage levels and/or the second voltage levels, and controls the at least one LED to generate lighting behavior based on the drive command.

Further another object of the present disclosure is to provide a method of controlling an LED string control system with signal identification function to solve problems of the existing technology. The method provides a control signal to control at least one LED module of an LED string to generate lighting behavior based on a light command, and the light command is composed of a plurality of first digital logics and a plurality of second digital logics in a specific sequence. The method includes steps of: adjusting a voltage level of the control signal to a plurality of first voltage levels according to the first digital logics; adjusting the voltage level of the control signal to a plurality of second voltage levels according to the second digital logics; interlacedly sequencing the voltage level of the control signal based on the first digital logics and the second digital logics interlaced to each other, and directly adjusting the first voltage level to the second voltage level, or directly adjusting the second voltage level to the first voltage level; and adjusting the voltage level of the control signal to a third voltage level as a distinction voltage level for distinguishing the two consecutive first voltage levels and/or the two consecutive second voltage levels based on consecutive first digital logics and/or consecutive second digital logics.

The main purpose and effect of the present disclosure are: since the voltage level of the control signal is used as digital logics of "0" or "1" instead of using the time width as digital logics, it is not necessary to wait for the full/complete time width of a specific logic before determining the time width of the control signal to be "0" or "1" for the LED modules, and it will not cause the logic to be unidentifiable due to waveform distortion, which can significantly reduce the transmission time and determination time of the light command.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
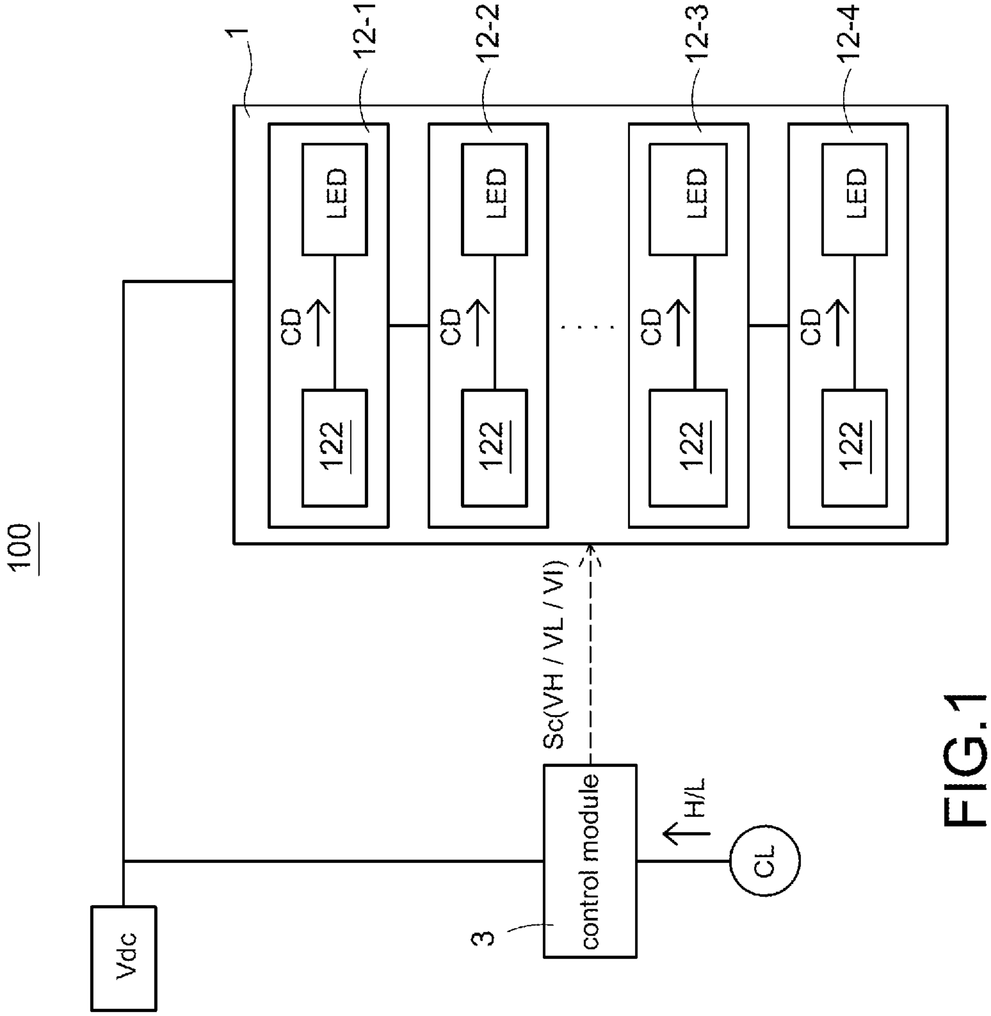
FIG. 1 is a block diagram of an LED string control system with signal identification function according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of an LED string control system with signal identification function according to the present disclosure. The LED (light-emitting diode) light string control system 100 receives a DC (direct-current) voltage Vdc. The LED string control system 100 includes a LED string 1 and a control module 3. The LED string 1 receives the DC voltage Vdc, and the LED string 1 includes a plurality of LED modules 12-1 to 12-4 (in this embodiment, four LED modules are illustrated, but it does not rule out the implementation of one LED module). The control module 3 receives the DC voltage Vdc required for operation, and are coupled to the LED modules 12-1 to 12-4. The control module 3 provides a control signal Sc to control the LED modules 12-1 to 12-4 to generate lighting behavior (such as, bright/extinguished, or flickering) according to a light command CL. Furthermore, each LED module 12-1 to 12-4 includes an LED controller 122 and at least one LED LED, and the LED controller 122 is coupled to the at least one LED LED. For example, but not limited to, the LED modules 12-1 to 12-4 may include single-color LEDs, three-primary-color LEDs, and/or other color LEDs, and the LED controller 122 controls the lighting behavior of the LED LED according to the control signal Sc. In particular, the control signal Sc may be transmitted using various techniques such as, but not limited to, carrier-wave control, signal line transmission, etc., so it is represented by dotted lines, which will be further described later.

Moreover, the light command CL usually includes a digital logic composed of “0” and “1”, and is mainly a specific command in which “0” and “1” are arranged and combined in a specific order, for example, but not limited to “11010”. By coding the digital logic, the specific LED modules 12-1 to 12-4 can be designated to generate a specific lighting behavior. For example, but not limited to “00” and “101” designate the lighting behavior of the LED module 12-1 (corresponding to “00”) to flicker (corresponding to “101”). The LED controller 122 of the LED module 12-1 to 12-4 can realize the lighting behavior to be generated by itself according to a specific signal segment in the digital logic. That is, the digital logic includes at least one logic segment, and each LED module 12-1 to 12-4 correspondingly captures the signal segment corresponding to the logic segment in the control signal Sc to which it belongs so as to generate lighting behavior accordingly.

For example, the digital logic consists of a single logic segment. The control module 3 performs segmentation based on the single logic segment to generate the control signal Sc composed of four signal segments. The LED modules 12-1 to 12-4 respectively capture the signal segments to which they belong, so as to generate lighting behaviors accordingly. Alternatively, the digital logic consists of four logic segments. The control module 3 integrates the four logic segments to generate the control signal Sc of a single signal segment that is integrated into one. The LED modules 12-1 to 12-4 respectively receive the control signal Sc, and capture the signal segment to which they belong from the single signal segment, so as to generate lighting behaviors accordingly. Alternatively, the digital logic consists of a single logic segment. The control module 3 performs segmentation based on the single logic segment to generate the control signal Sc composed of eight signal segments. The LED modules 12-1 to 12-4 respectively capture the two signal segments to which they belong, so as to generate lighting behaviors accordingly.

Specifically, the light command CL includes a plurality of first digital logics H (for example, but not limited to "1") and a plurality of second digital logics L (for example, but not limited to "0"). Preferably, the light command CL may be composed of the plurality of first digital logics H, the plurality of second digital logics L, and/or a combination of the two to form a specific sequence according to actual needs. In particular, the present disclosure takes the combination of the two as the main embodiment, but is not actually limited to this. Moreover, the control module 3 can respectively provide a plurality of first voltage levels VH and a plurality of second voltage levels VL based on the first digital logics H and the second digital logics L of the light command CL to form the control signal Sc. Therefore, the control module 3 correspondingly adjusts the voltage level of the control signal Sc to the first voltage level VH (such as, but not limited to, high voltage level such as 3 volts, 5 volts, etc.) based on the first digital logics H of the light command CL. The control module 3 also correspondingly adjusts the voltage level of the control signal Sc to the second voltage level VL (such as, but not limited to, low voltage level such as 0 volt, −3 volts, etc.) based on the second digital logics L of the light command CL.

Moreover, the control module 3 can adjust voltage levels based on the first digital logics H and the second digital logics L that appear successively. When the light command CL includes the first digital logics H and the second digital logics L which are interlaced to each other, the control module 3 directly adjusts the voltage level of the control signal from the first voltage level VH to the second voltage level VL based on the interlaced sequence, or directly adjusts the voltage level of the control signal from the second voltage level VL to the first voltage level VH based on the interlaced sequence. In particular, the "directly" means that the voltage level does not maintain a fixed/constant value for a certain period of time during adjusting the first voltage level VH to the second voltage level VL or adjusting the second voltage level VL to the first voltage level VH. For example, the control module 3 can directly and continuously adjust the voltage level of the control signal Sc from the first voltage level VH to the second voltage level VL based on the successive occurrence of the first digital logics H and the second digital logics L, or can directly and continuously adjust the voltage level of the control signal Sc from the second voltage level VL to the first voltage level VH based on the successive occurrence of the second digital logics L and the first digital logics L. In one embodiment of the present disclosure, the above-mentioned logics, signals and their corresponding relationships are only examples, and are not limited thereto.

Since the LED string control system 100 determines the digital logic of "0" or "1" according to the signal level, instead of only determining the digital logic according to the time width, if there are consecutive first digital logics H or consecutive second digital logics L, it must be distinguished to prevent the consecutive logics from being determined as a single logic. Therefore, the control module 3 adjusts the control signal Sc to a third voltage level as a distinction voltage VI to distinguish the two consecutive first voltage levels VH once the first digital logics H of the light command CL appear consecutively. Similarly, the control module 3 adjusts the control signal Sc to the third voltage level as the distinction voltage VI to distinguish the two consecutive second voltage levels VL once the second digital logics L of the light command CL appear consecutively.

The control module 3 may directly adjust the voltage level of the control signal Sc to the corresponding distinction voltage VI when two consecutive identical digital logics are detected. It is also possible to generate distinction logic (internally generated by the control module 3) for distinguishing between two identical logics after detecting two consecutive identical logics, and then adjust the voltage level of the control signal Sc to the distinction voltage VI, which is different from the first voltage level VH and the second voltage level VL. Therefore, the LED controller 122 of the LED modules 12-1 to 12-4 may correspondingly generate the drive command CD according to the plurality of first voltage levels VH and second voltage levels VL (the distinction voltage VI is only used for distinction) to control the LED LED to generate lighting behavior according to the drive command CD. In one embodiment, the LED modules 12-1 to 12-4 are coupled in series, but they may also be coupled in parallel (not shown).

The main purpose and effect of the present disclosure are: since the LED string control system 100 uses the voltage level of the control signal Sc as the digital logic of "0" or "1", instead of using the time width as the digital logic of "0" or "1", the LED modules 12-1 to 12-4 can determine whether the time width of the control signal Sc represents "0" or "1" without waiting for the complete time width of the specific logic, and it will not cause the control signal Sc to be unrecognizable due to waveform distortion, thereby significantly reducing the transmission time and determination time of the light command CL. In one embodiment, the LED string control system 100 may be a two-wire control system or a three-wire control system, which will be further described later, and will not be repeated here.

Figure 2A:
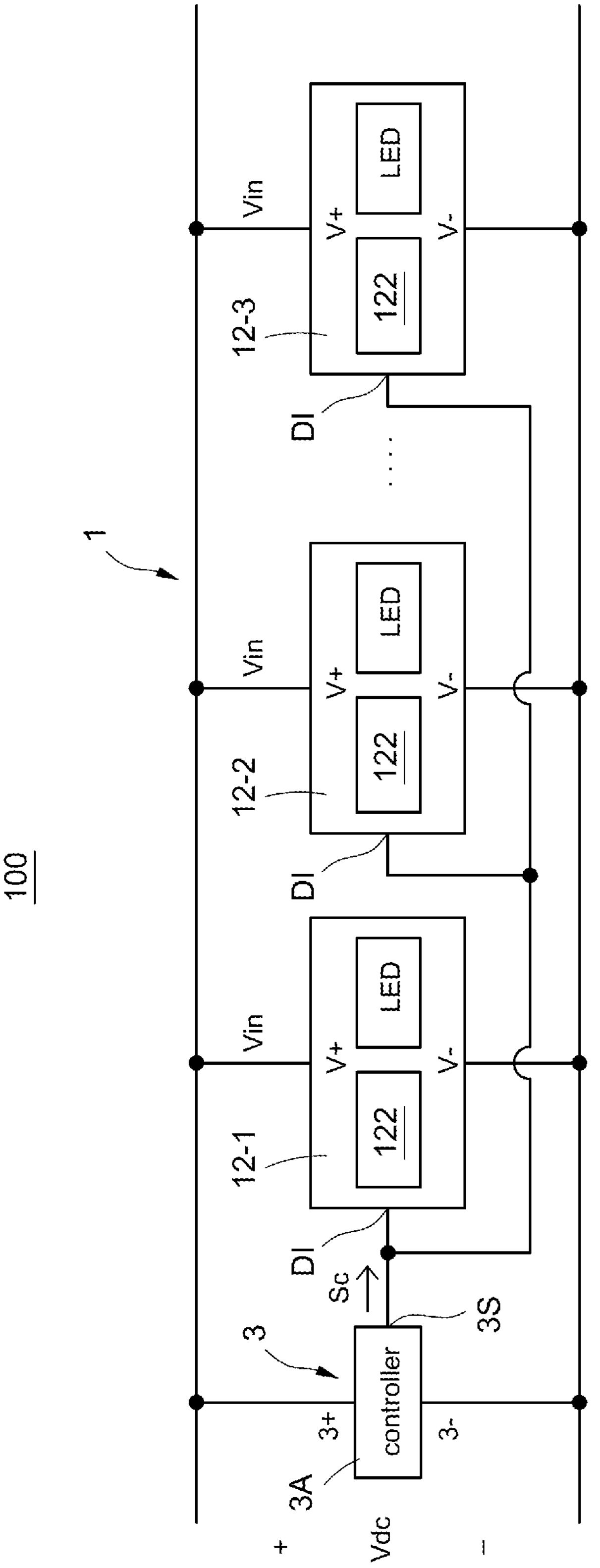
FIG. 2A is a block circuit diagram of the LED string control system of transmitting a control signal by using a signal end according to a first embodiment of the present disclosure.
Figure 2B:
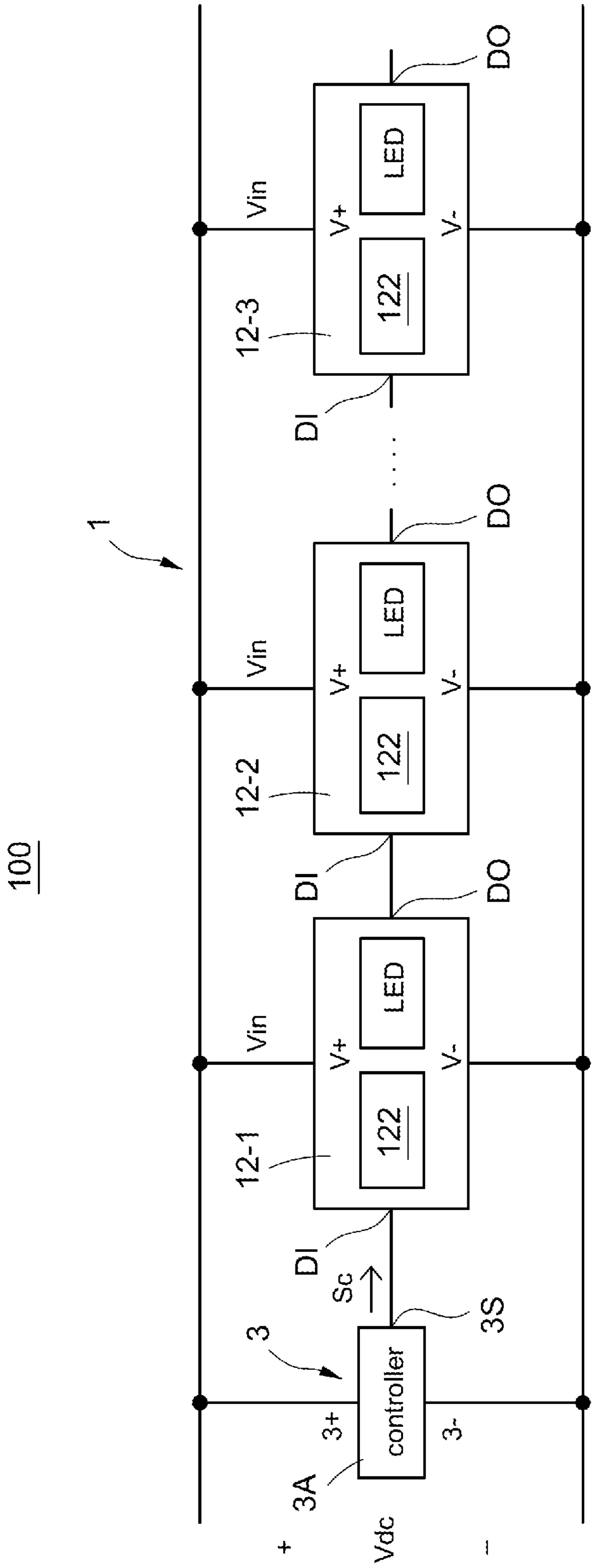
FIG. 2B is a block circuit diagram of the LED string control system of transmitting the control signal by using the signal end according to a second embodiment of the present disclosure.
Figure 2C:
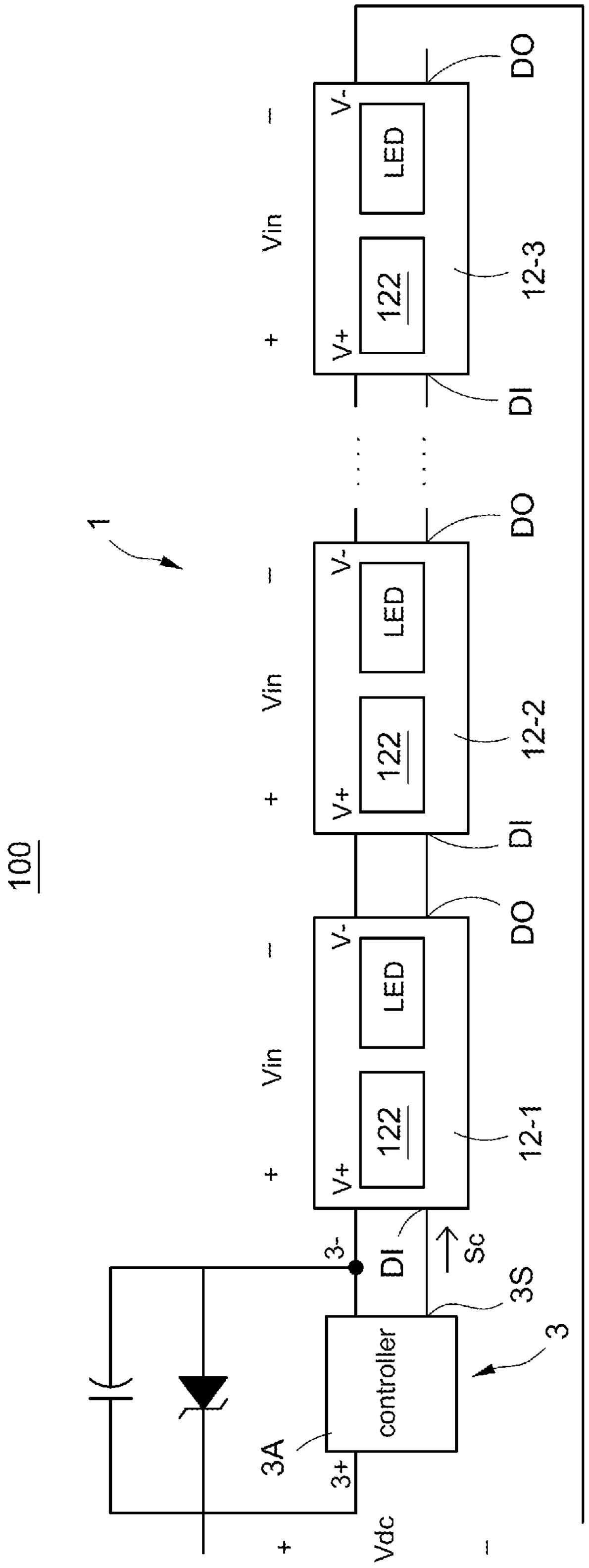
FIG. 2C is a block circuit diagram of the LED string control system of transmitting the control signal by using the signal end according to a third embodiment of the present disclosure.

Please refer to FIG. 2A, which shows a block circuit diagram of the LED string control system of transmitting a control signal by using a signal end according to a first embodiment of the present disclosure; please refer to FIG. 2B, which shows a block circuit diagram of the LED string control system of transmitting the control signal by using the signal end according to a second embodiment of the present disclosure; please refer to FIG. 2C, which shows a block circuit diagram of the LED string control system of transmitting the control signal by using the signal end according to a third embodiment of the present disclosure, and also refer to FIG. 1. In FIG. 2A to FIG. 2C, the control module 3 of the LED string control system 100 is a controller 3A having a signal end. In FIG. 2A, the controller 3A includes a bus positive end 3+, a bus negative end 3−, and a signal end 3S, and each LED module 12-1 to 12-4 includes a positive end V+, a negative end V−, and a signal-receiving end DI. The controller 3A receives the input voltage Vin required for operation through the bus positive end 3+ and the bus negative end 3−, and the LED module 12-1 to 12-4 receives the input voltage Vin required for operation through the positive end V+ and the negative end. Since the controller 3A and the LED modules 12-1 to 12-4 are in a parallel structure, and the power source received by the LED string control system 100 is the DC voltage Vdc, the input voltage Vin is the DC voltage Vdc. The signal-receiving end DI is used for receiving the control signal Sc so as to generate the drive command CD correspondingly based on the control signal Sc, and control the LED LED to generate lighting behavior through the drive command CD.

Specifically, The LED controllers 122 of the plurality of LED modules 12-1 to 12-4 receive the input voltage Vin through the positive end V+ and the negative end V−, and the signal-receiving ends DI of the LED modules 12-1 to 12-4 are respectively coupled to the signal end 3S so that the LED controllers 122 of the LED modules 12-1 to 12-4 can receive the control signal Sc provided by the signal end 3S through the signal-receiving ends DI.

The control signal Sc is composed according to a specific sequence as described above, and has a first voltage level VH and a second voltage level VL that change successively (i.e., the switching between the first voltage level VH and the second voltage level VL is direct and uninterrupted). In addition, the control signal Sc also has a distinction voltage VI for distinguishing two consecutive first voltage levels VH and/or two consecutive second voltage levels VL. The LED controller 122 of the LED module 12-1 to 12-4 can identify the distinction voltage VI, and realize that the distinction voltage VI is for distinguishing only. Therefore, the LED controller 122 can realize the two consecutive first voltage levels VH and/or the two consecutive second voltage levels VL by identifying the distinction voltage VI, and the drive command CD is correspondingly generated based on the specific sequence of the first voltage level VH and the second voltage level VL of the control signal Sc. Accordingly, the LED LED can be controlled to generate lighting behavior through the drive command CD.

In FIG. 2B, the circuit structure of the LED string control system 100 is similar to that of FIG. 2A, the difference is that the LED module 12-1 to 12-4 further include a signal output end DO. The LED modules 12-1 to 12-4 are connected in series, and the signal output end DO is coupled to the signal-receiving end DI of the previous LED module 12-1 to 12-4 in sequence. The signal-receiving end DI (i.e., the first signal-receiving end D1) of the LED module 12-1 is coupled to the signal end 3S of the controller 3A to receive the control signal Sc provided by the signal end 3S. The control signal Sc received by the signal-receiving end DI of the first LED module 12-1 is internally processed by the LED controller 122 and internally transmitted, and then provided to the signal output end DO so that the control signal Sc received by the LED controller 122 is provided to the expansion modules coupled to the rear end for use. In one embodiment, the LED modules 12-2 to 12-4 coupled behind, for example but not limited to, may be any module that needs to use the control signal Sc. In one embodiment, the circuit structure and operation mode not mentioned in FIG. 2B are the same as those in FIG. 2A, and the detail description is omitted here for conciseness.

In FIG. 2C, the circuit structure of the LED string control system 100 is slightly different from that of FIG. 2A and FIG. 2B, the difference is that the LED modules 12-1 to 12-4 are connected in series. Specifically, in FIG. 2C, besides that the signal output ends DO in FIG. 2B are connected in series, the LED modules 12-1 to 12-4 are also connected in series by coupling the positive end V+ to the negative end V− of the previous LED module 12-1 to 12-4. The positive end V+ of the first LED module 12-1 and the negative end V− of the last LED module 12-4 receive the DC voltage Vdc so that the input voltage Vin received by each of the LED modules 12-1 to 12-4 is the average of the DC voltage Vdc. In one embodiment, the circuit structure and operation mode not mentioned in FIG. 2C are the same as those in FIG. 2A, and the detail description is omitted here for conciseness.

Figure 3:
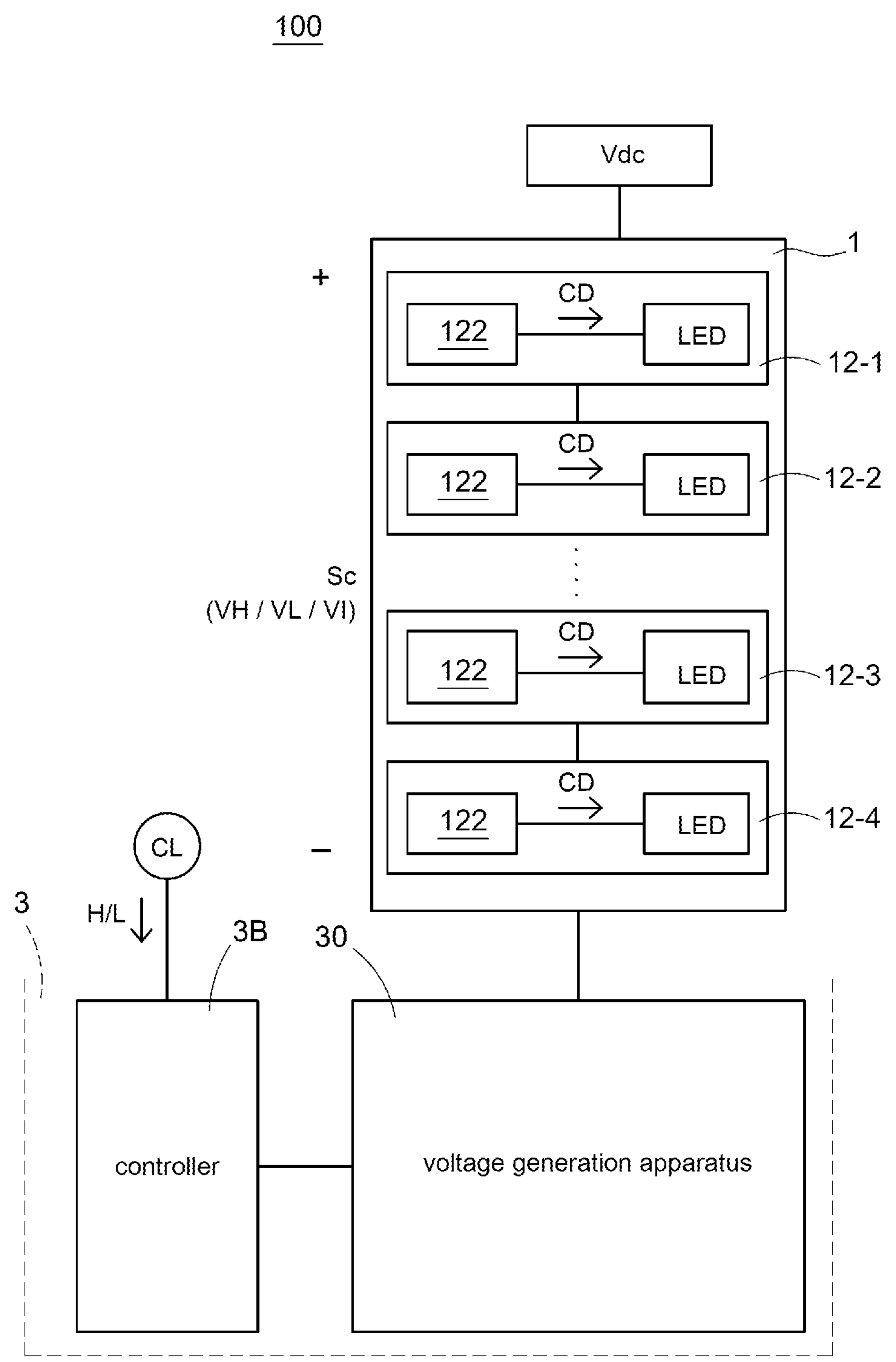
FIG. 3 is a block circuit diagram of the LED string control system of transmitting the control signal by using a carrier wave according to the present disclosure.

Please refer to FIG. 3, which shows a block circuit diagram of the LED string control system of transmitting the control signal by using a carrier wave according to the present disclosure, and also refer to FIG. 1 to FIG. 2C. The difference between FIG. 3 and FIG. 2A to FIG. 2C is that the control module 3 does not the signal end 3S, and therefore the transmission of the control signal Sc is implemented by adding the control signal Sc to the DC voltage Vdc. In FIG. 3, the control module 3 includes a voltage generation apparatus 30 and a controller 3B, and the LED string 1 and the controller 3B receive the DC voltage Vdc. The voltage generation apparatus 30 is coupled to the LED string 1, and the controller 3B is coupled to the voltage generation apparatus 30. The controller 3B mainly controls the voltage generation apparatus 30 to generate a specific voltage of a specific sequence based on the light command CL so that the DC voltage Vdc is affected by the specific voltage of the specific sequence, and therefore the voltage across the two ends of the LED string 1 changes in voltage level, and the across voltage with the voltage change is the control signal Sc.

The LED controller 122 of each LED module 12-1 to 12-4 realizes the lighting behavior to be generated by itself based on the change of the control signal Sc, and controls the LED LED accordingly. The controller 3B controls the voltage generation device 30 to generate a specific voltage based on the first digital logic H so as to adjust the control signal Sc to a first voltage level VH (such as but not limited to, a higher signal) that is the difference between the DC voltage Vdc and the specific voltage. The controller 3B also controls the voltage generation device 30 to generate another specific voltage based on the second digital logic L so as to adjust the control signal Sc to a second voltage level VL (such as but not limited to a lower level) that is the difference between the DC voltage Vdc and the another specific voltage.

Figure 4:
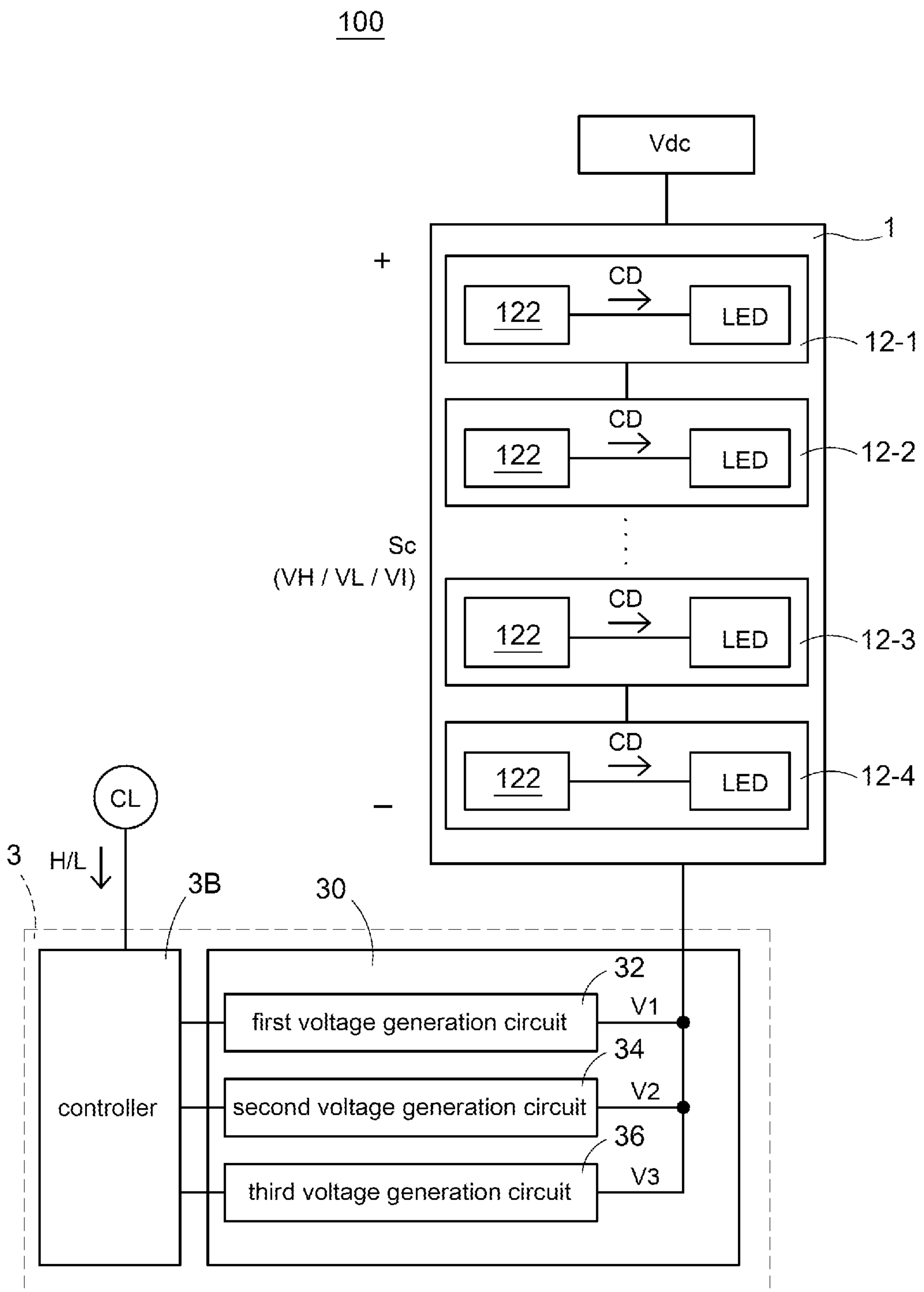
FIG. 4 is a block circuit diagram of a voltage generation apparatus according to the present disclosure.

Please refer to FIG. 4, which shows a block circuit diagram of a voltage generation apparatus according to the present disclosure. The voltage generation apparatus 30 includes a first voltage generation circuit 32 and a second voltage generation circuit 34. The first voltage generation circuit 32 and the second voltage generation circuit 34 are coupled to the LED string 1 and the controller 3B. When the light command CL is the first digital logic H, the controller 3B controls the first voltage generation circuit 32 to generate a first voltage V1 according to the first digital logic H so as to adjust the control signal Sc to the first voltage level VH. When the light command CL is the second digital logic L, the controller 3B controls the second voltage generation circuit 34 to generate a second voltage V2 according to the second digital logic L so as to adjust the control signal Sc to the second voltage level VL.

A third voltage generation circuit 36 is used to generate a third voltage V3 due to the distinction of two identical voltage levels so that the control signal Sc is adjusted to the distinction voltage VI, which is different from the first voltage level VH and the second voltage level VL. Specifically, the third voltage generation circuit 36 is coupled to the LED string 1 and the controller 3B. The controller 3B controls the third voltage generation circuit 36 to generate the third voltage V3 so as to adjust the across voltage (voltage difference) to the distinction voltage VI.

In one embodiment, the controller 3A, 3B may be a controller, which may be a controller composed of components such as circuits (such as operational amplifiers, resistors, capacitors, etc.), logic gates, or a programmable microcontroller. The controller 3A, 3B may also include a detection unit (not shown) for detecting the voltage/current of each point at the LED string control system 100 so as to stabilize the overall system by manners of detection and feedback.

Figure 5A:
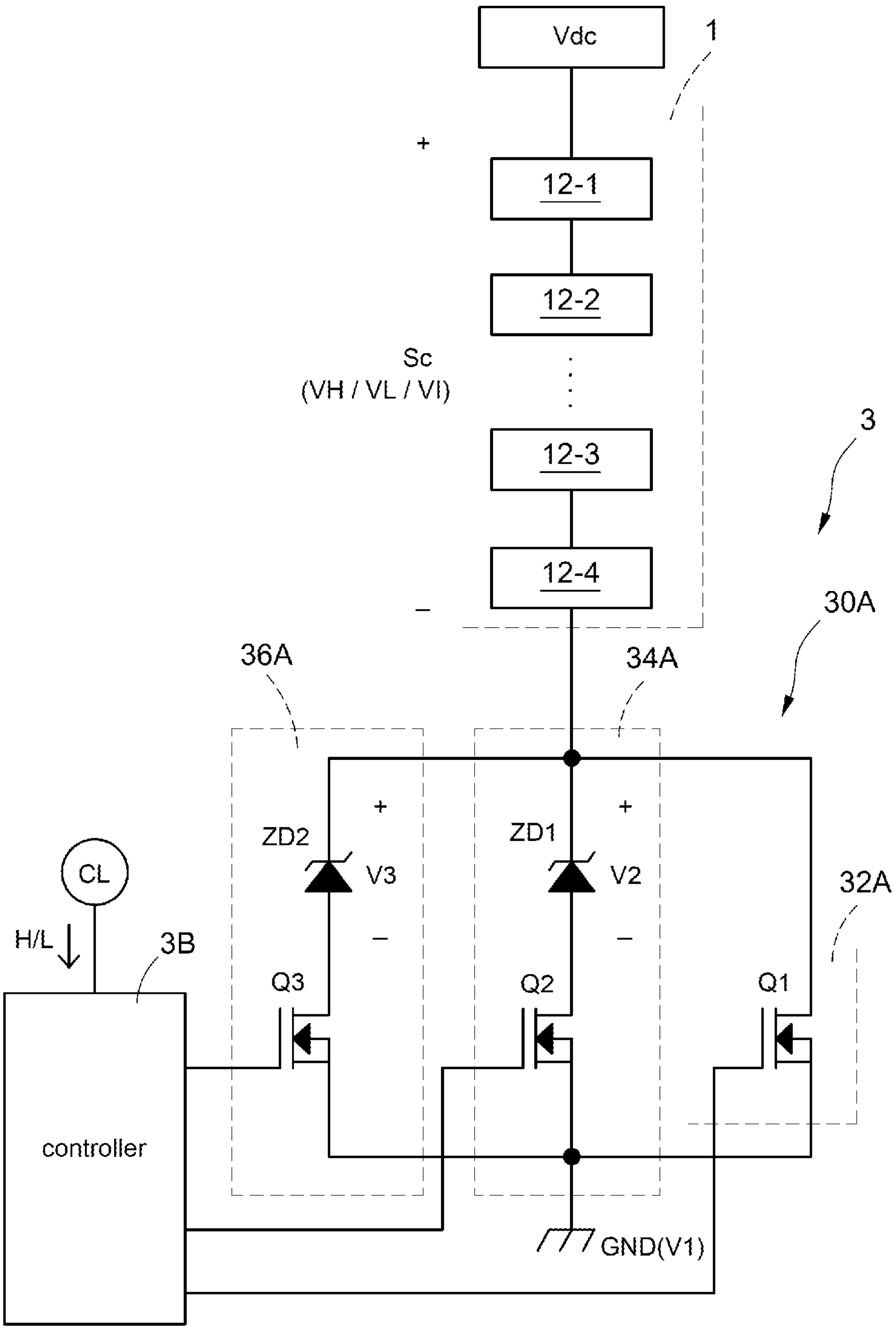
FIG. 5A is a detailed block circuit diagram of the LED string control system of transmitting the control signal by using the carrier wave according to a first embodiment of the present disclosure.
Figure 5B:
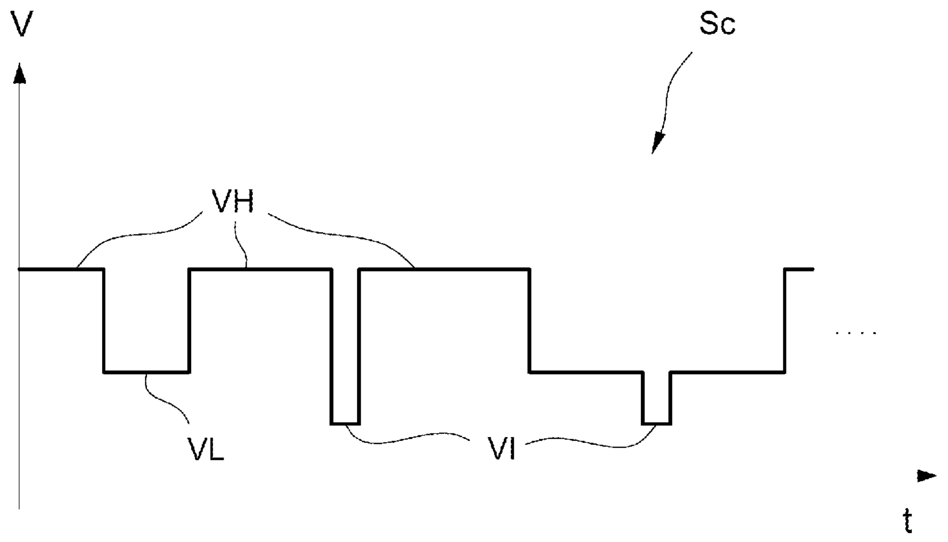
FIG. 5B is a schematic waveform of a signal of the LED string control system of transmitting the control signal by using the carrier wave shown in FIG. 5A.

Please refer to FIG. 5A, which shows a detailed block circuit diagram of the LED string control system of transmitting the control signal by using the carrier wave according to a first embodiment of the present disclosure, and refer to FIG. 5B, which shows a schematic waveform of a signal of the LED string control system of transmitting the control signal by using the carrier wave shown in FIG. 3A, and also refer to FIG. 1 to FIG. 4. In the voltage generation apparatus 30A, the first voltage generation circuit 32A includes a first switch Q1. The first switch is coupled to the LED string 1 and a ground point GND, and a control end of the first switch Q1 is coupled to the controller 3B. When the light command CL is the first digital logic H, the controller 3B turns on the first switch Q1 to make one end of the LED string 1 be grounded. In this condition, one end of the LED string 1 is grounded and the other end thereof receives the DC voltage Vdc, and therefore a voltage level of the ground point GND, for example, but not limited to zero volt is the first voltage V1, and the control signal Sc (i.e., the first voltage level VH) of the LED string 1 is the DC voltage Vdc (refer to FIG. 5B). On the contrary, when the light command CL is not the first digital logic H, the controller 3B turns off the first switch Q1 to disconnect a path of the first voltage generation circuit 32A.

The second voltage generation circuit 34A is connected to the first voltage generation circuit 32A in parallel. The second voltage generation circuit 34A includes a first regulation component ZD1 and a second switch Q2. The first regulation component ZD1 is coupled to the LED string 1. The second switch Q2 is coupled to the first regulation component ZD1 and the ground point GND, and a control end of the second switch Q2 is coupled to the controller 3B. When the light command CL is the second digital logic L, the controller 3B turns on the second switch Q2 so that the first regulation component ZD1 generates the second voltage V2 due to the turned-on second switch Q2. In this condition, one end of the LED string 1 receives the second voltage V2, and the other end thereof receives the DC voltage Vdc, and therefore the control signal Sc (i.e., the second voltage level VL) is adjusted to the DC voltage Vdc minus the second voltage V2 (refer to FIG. 3B). For example, when the second switch Q2 is turned on, the first regulation component ZD1 generates the second voltage V2 of 30 volts, the second voltage level VL is the DC voltage Vdc (assuming 100 volts) minus 30 volts. On the contrary, when the light command CL is not the second digital logic L, the controller 3B turns off the second switch Q2 so that a path of the second voltage generation circuit 34A is disconnected. In particular, the first regulation component ZD1 may be, for example, but not limited to, a Zener diode, or any component and any circuit that may be used for voltage regulation should be included in the scope of the present disclosure.

The third voltage generation circuit 36A is connected to the first voltage generation circuit 32A in parallel. The third voltage generation circuit 36A includes a second regulation component ZD2 and a third switch Q3. It is similar to the second voltage generation circuit 34A, when the light command CL is two identical logics, the controller 3B turns on the third switch Q3 between the two identical logics so that the second regulation component ZD2 generates the third voltage V3. Therefore, the control signal Sc (i.e., the distinction voltage VI) is adjusted to the DC voltage Vdc minus the third voltage V3 (refer to FIG. 5B). For example, but not limited to, when the third switch Q3 is turned on, the second regulation component ZD2 generates the third voltage V3 of 50 volts, and the distinction voltage VI is equal to the DC voltage Vdc (assuming 100 volts) minus 50 volts. On the contrary, when the light command CL is not two identical logics, the controller 3B turns off the third switch Q3 so that a path of the third voltage generation circuit 36A is disconnected. In particular, the second regulation component ZD2 may be, for example, but not limited to, a Zener diode, or any component and any circuit that may be used for voltage regulation should be included in the scope of the present disclosure.

Figure 6A:
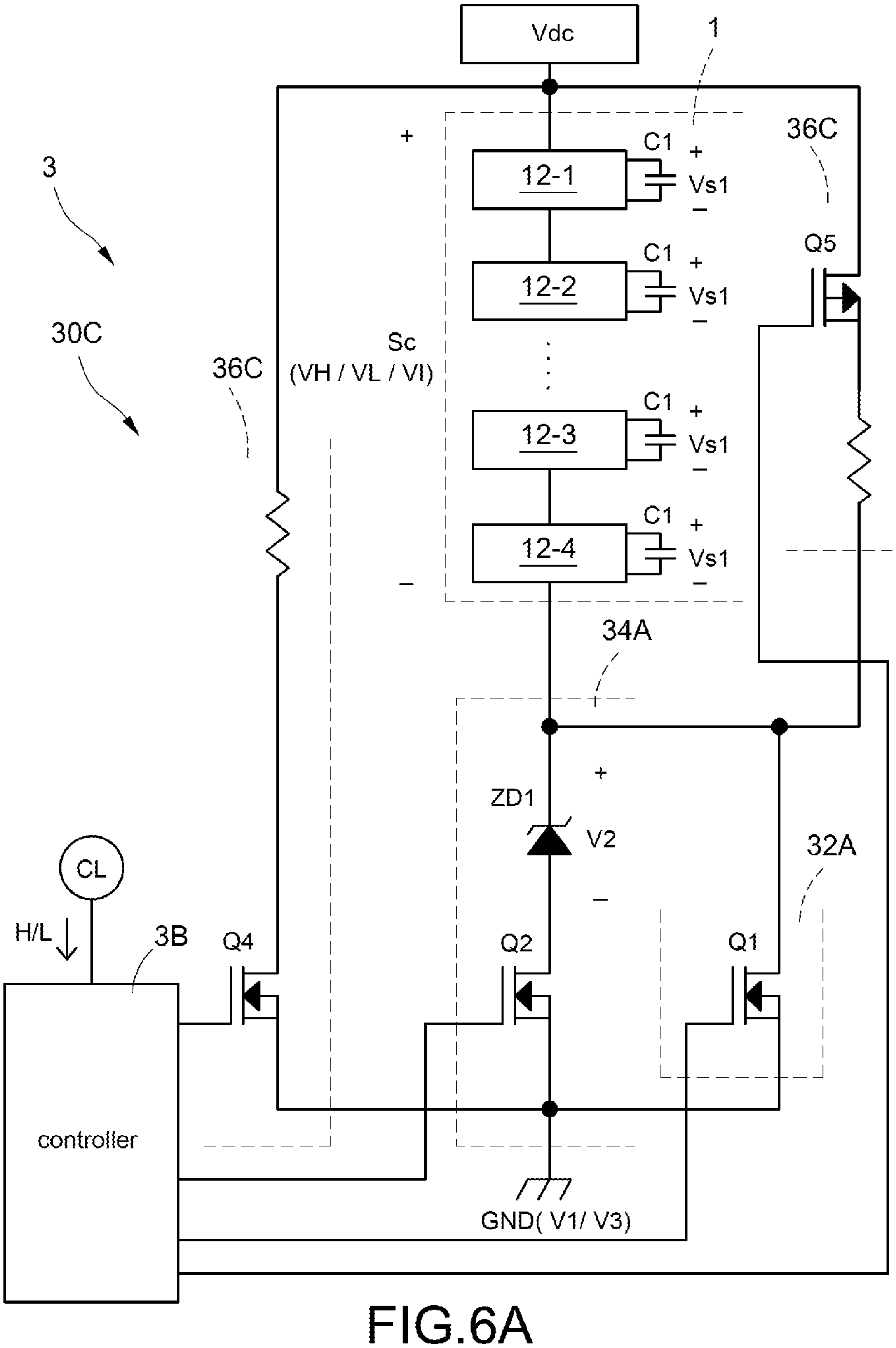
FIG. 6A is a detailed block circuit diagram of the LED string control system of transmitting the control signal by using the carrier wave according to a second embodiment of the present disclosure.
Figure 6B:
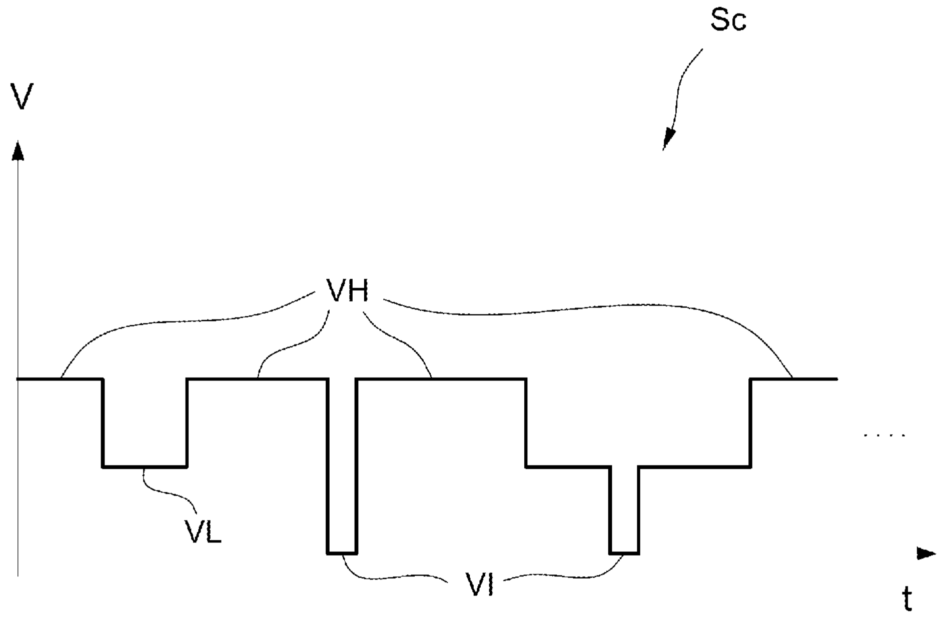
FIG. 6B is a schematic waveform of a signal of the LED string control system of transmitting the control signal by using the carrier wave shown in FIG. 6A.

Please refer to FIG. 6A, which shows a detailed block circuit diagram of the LED string control system of transmitting the control signal by using the carrier wave according to a second embodiment of the present disclosure, and refer to FIG. 6B, which shows a schematic waveform of a signal of the LED string control system of transmitting the control signal by using the carrier wave shown in FIG. 6A, and also refer to FIG. 1 to FIG. 5B. The difference between the voltage generation apparatus 30C shown in FIG. 6A and the voltage generation apparatus 30A shown in FIG. 5A is that the third voltage generation circuit 36C includes a fourth switch Q4 and a fifth switch Q5. The fourth switch Q4 is coupled to the LED string 1 and the ground point GND, and a control end of the fourth switch Q4 is coupled to the controller 3B. Therefore, when the fourth switch Q4 is turned on, a ground voltage (usually zero volt) of the ground point GND is used as the third voltage V3. The fifth switch Q5 is coupled to the LED string 1 in parallel, and a control end of the fifth switch Q5 is coupled to the controller 3B. When the light command CL is two identical logics, the controller 3B turns on the fourth switch Q4 and the fifth switch Q5 between the two identical logics so that a voltage at two ends of the LED string 1 is fixed at the third voltage V3. Therefore, the control signal Sc is adjusted to the third voltage V3 as the distinction voltage VI (refer to FIG. 6B). On the contrary, when the light command CL is not two identical logics, the controller 3B turns off the fourth switch Q4 and the fifth switch Q5 so that a path of the third voltage generation circuit 36C is disconnected. In one embodiment, the components, the coupling relationship between the components, and the operation manners not described in FIG. 6A and FIG. 6B are all the same as those in FIG. 5A and FIG. 5B, and the detailed description is omitted here for conciseness.

Since the distinction voltage VI is zero volt, if the LED string 1 does not have the power-off memory function, the too-low voltage (such as but not limited to 30 volts or less) will trigger a reset function so that the data (such as the drive command CD) stored in the LED modules 12-1 to 12-4 are deleted due to reset. In order to prevent the LED string 1 from being reset due to the distinction voltage VI, each LED module 12-1 to 12-4 needs to use a first capacitor C1. The first capacitor C1 is connected to the LED modules 12-1 to 12-4 in parallel to provide a first energy storage voltage Vs1 to regulate the LED modules 12-1 to 12-4 so as to prevent the LED modules 12-1 to 12-4 from being reset when the voltage is too low.

Figure 7A:
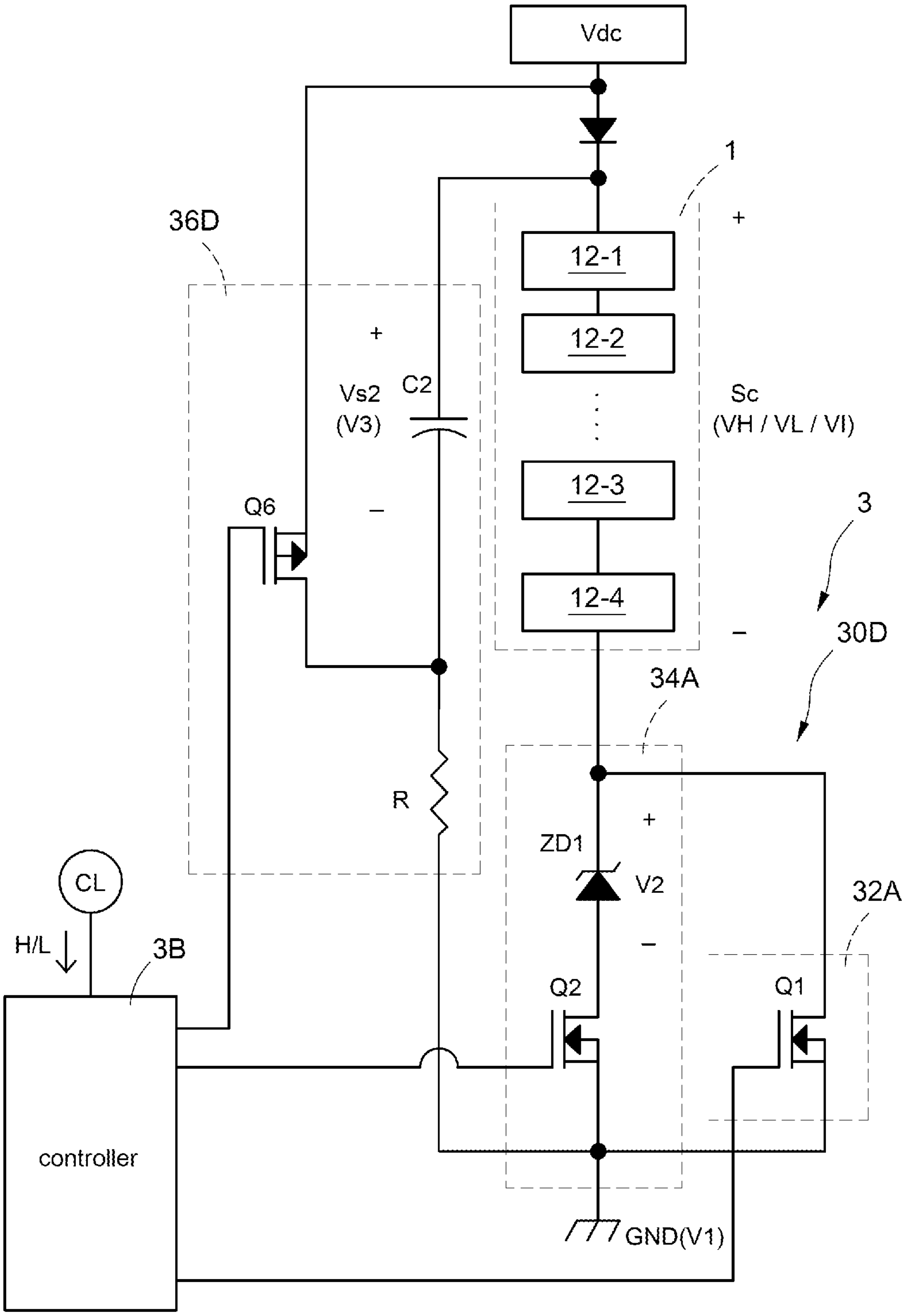
FIG. 7A is a detailed block circuit diagram of the LED string control system of transmitting the control signal by using the carrier wave according to a third embodiment of the present disclosure.
Figure 7B:
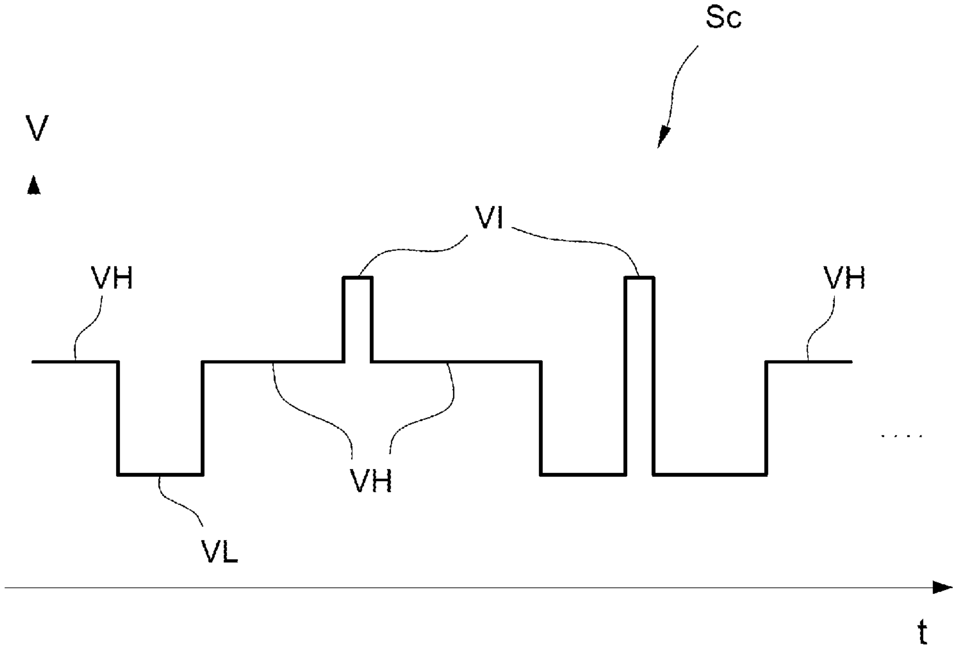
FIG. 7B is a schematic waveform of a signal of the LED string control system of transmitting the control signal by using the carrier wave shown in FIG. 7A.

Please refer to FIG. 7A, which shows a detailed block circuit diagram of the LED string control system of transmitting the control signal by using the carrier wave according to a third embodiment of the present disclosure, and refer to FIG. 7B, which shows a schematic waveform of a signal of the LED string control system of transmitting the control signal by using the carrier wave shown in FIG. 7A, and also refer to FIG. 1 to FIG. 6B. The difference between the voltage generation apparatus 30D shown in FIG. 7A and the voltage generation apparatus shown in FIG. 5A is that the third voltage generation circuit 36D includes a second capacitor C2, a sixth switch Q6, and a resistor R. The second capacitor C2 is coupled to the LED string 1. The sixth switch Q6 is coupled to the second capacitor C2 in parallel, and a control end of the sixth switch Q6 is coupled to the controller 3B. A first end of the resistor R is coupled to the second capacitor C2 and the sixth switch Q6, and a second end of the resistor R is coupled to the ground point GND. When the controller 3B turns off the sixth switch Q6, the DC voltage Vdc charges the second capacitor C2 through a path provided by the second capacitor C2, the resistor R, and the ground point GND so that a second energy storage voltage Vs2 is stored in the second capacitor C2. When the light command CL is two identical logics, the controller 3B turns on the sixth switch Q6 between the two identical logics so that the second energy storage voltage Vs2 is used as the third voltage V3 to one end (of receiving the DC voltage Vdc) of the LED string 1. Therefore, a voltage at one end of the LED string 1 is equal to the DC voltage Vdc plus the second energy storage voltage Vs2 so that the control signal Sc is adjusted to the distinction voltage VI that is equal to the DC voltage Vdc plus the distinction voltage VI (refer to FIG. 7B). On the contrary, when the light command CL is not two identical logics, the controller 3B turns off the sixth switch Q6 so that the second energy storage voltage Vs2 is not provided to one end of the LED string 1. In one embodiment, the components, the coupling relationship between the components, and the operation manners not described in FIG. 7A and FIG. 7B are all the same as those in FIG. 5A and FIG. 5B, and the detailed description is omitted here for conciseness.

Figure 8:
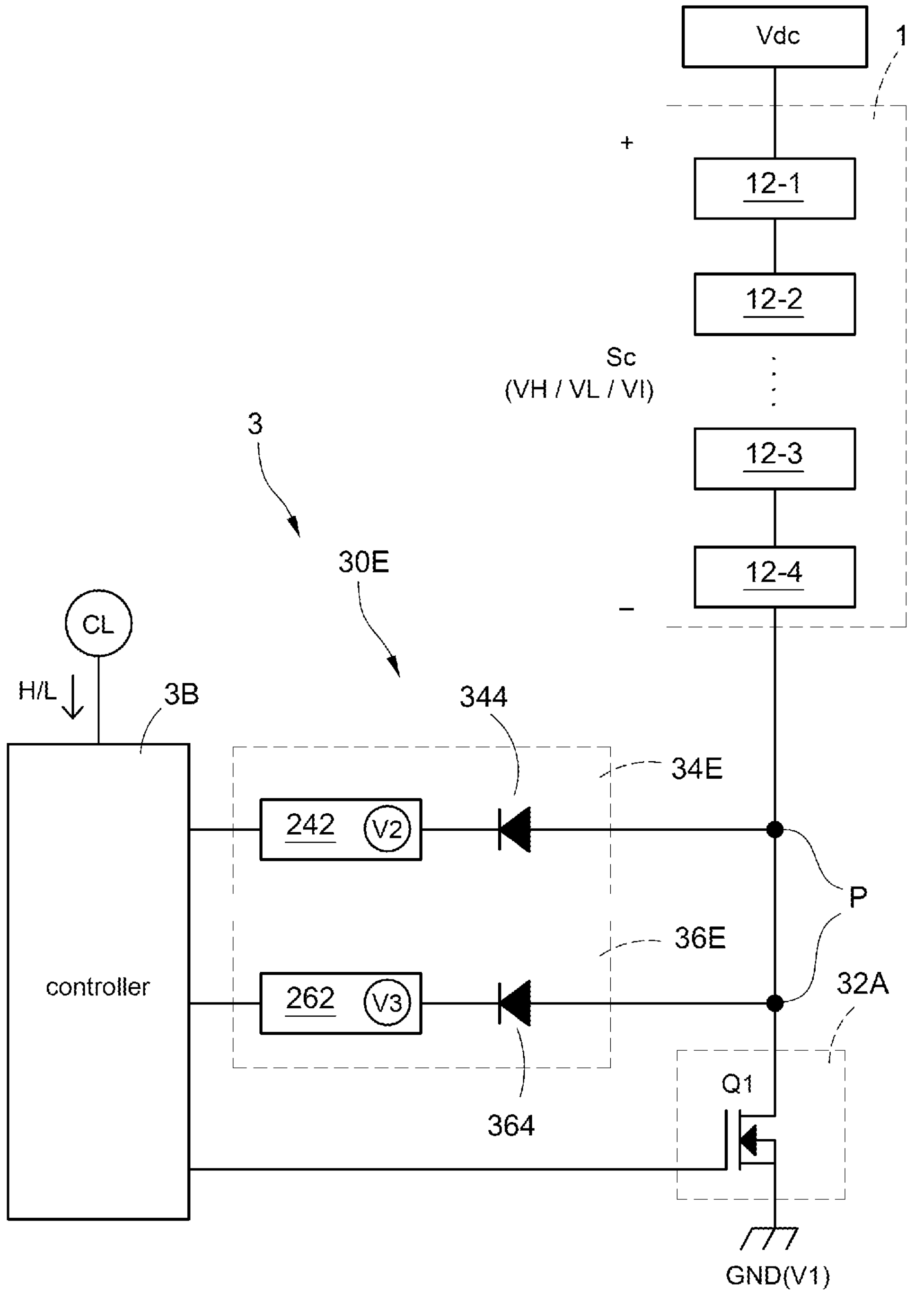
FIG. 8 is a detailed block circuit diagram of the LED string control system of transmitting the control signal by using the carrier wave according to a fourth embodiment of the present disclosure.

Please refer to FIG. 8, which shows a detailed block circuit diagram of the LED string control system of transmitting the control signal by using the carrier wave according to a fourth embodiment of the present disclosure, and also refer to FIG. 1 to FIG. 7B. The difference between the voltage generation apparatus 30E shown in FIG. 6 and the voltage generation apparatus 30A shown in FIG. 5A is that the second voltage generation circuit 34E includes a first voltage generation module 342 and a first unidirectional conduction component 344, and the third voltage generation circuit 36E includes a second voltage generation module 362 and a second unidirectional conduction component 364. The first voltage generation module 342 is coupled to a node P between the LED string 1 and a first switch Q1 of the first voltage generation circuit 32A, and the first unidirectional conduction component 344 is coupled between the node P and the first voltage generation module 342. The controller 3B is coupled to the first voltage generation module 342, and the first unidirectional conduction component 344 is used for unidirectional conduction (connection) of a path from the node P to the first voltage generation module 342. The coupling relationship of the third voltage generation circuit 36D is similar to that of the second voltage generation circuit 34E, and the detailed description is omitted here for conciseness. In one embodiment, the first voltage generation module 342 and the second voltage generation module 362 are, for example, but not limited to voltage generators. Any apparatus, circuit, component that can be used to generate a specific voltage source based on the control of the controller 3B should be included in the scope of the present disclosure.

The method of controlling the LED string control system is similar to FIG. 5A. When the light command CL is the second digital logic L, the controller 3B controls the first voltage generation module 342 to generate the second voltage V2 according to the second digital logic L so that the control signal Sc (i.e., the second voltage level VL) is adjusted to the DC voltage Vdc minus the second voltage V2. On the contrary, when the light command CL is not the second digital logic L, the first voltage generation module 342 does not work and does not generate the second voltage V2. When the light command CL is two identical logics, the controller 3B controls the second voltage generation module 362 to generate the third voltage V3 between the two identical logics so that the control signal Sc (i.e., the distinction voltage VI) is adjusted to the DC voltage Vdc minus the third voltage V3. On the contrary, when the light command CL is not two identical logics, the second voltage generation module 362 does not work and does not generate the third voltage V3. In one embodiment, the components, the coupling relationship between the components, and the operation manners not described in FIG. 8 are all the same as those in FIG. 5A, and the detailed description is omitted here for conciseness. In one embodiment, the first unidirectional conduction component 344 and the second unidirectional conduction component 364 are, for example, but not limited to diodes. Any component that can be used for unidirectional conduction (such as but not limited to a thyristor, etc.) should be included in the scope of the present disclosure.

In one embodiment, the circuit structures of FIG. 5A to FIG. 8 may be applied alternately, for example, but not limited to, the second voltage generation circuit 34E of FIG. 8 may be used as the second voltage generation circuit 34A of FIG. 5A, or the third voltage generation circuit 36C of FIG. 6A may be used as the third voltage generation circuit 36E of FIG. 8 (the LED modules 12-1 to 12-4 need to use a first capacitor C1). In addition, the voltage generation modules 342, 362 of FIG. 8 may generate specific voltages by setting so that the waveforms shown in FIG. 5B, FIG. 6B, and FIG. 7B may be generated based on the set parameters. The detailed waveform generation methods can be referred to above, and the detailed description is omitted here for conciseness.

Figure 9:
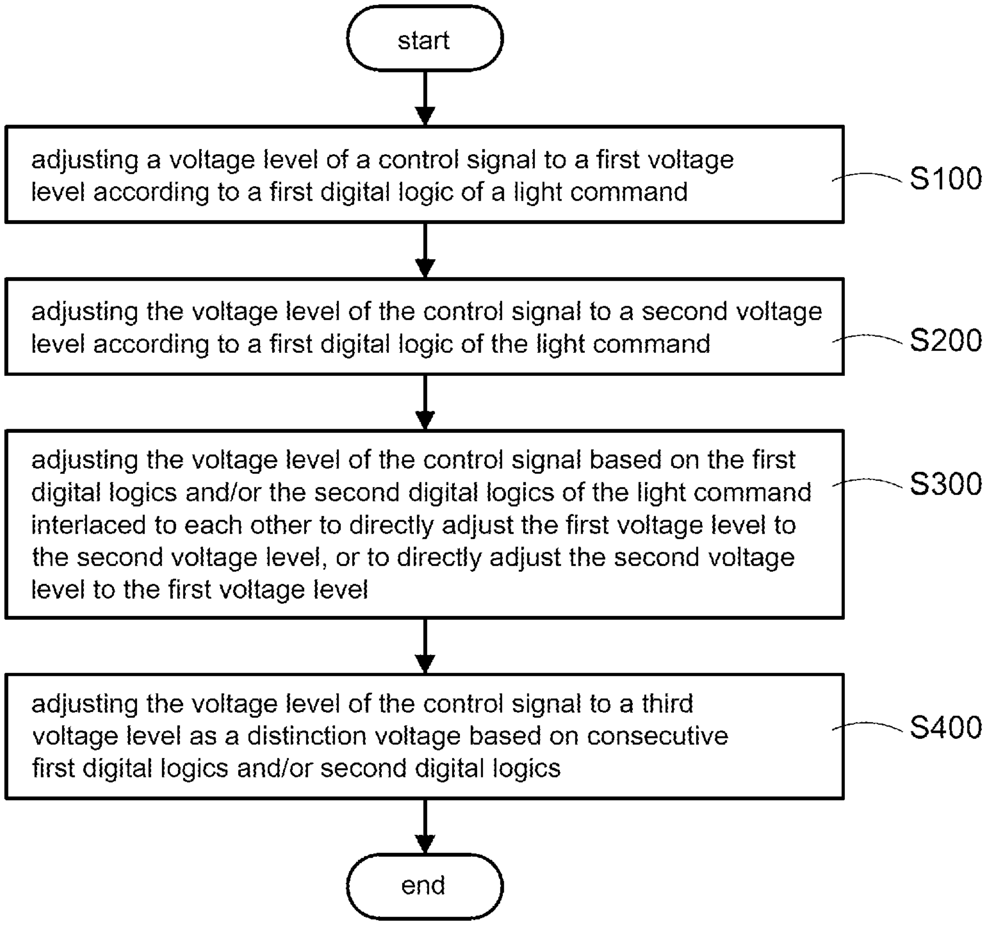
FIG. 9 is a flowchart of a method of controlling the LED string control system according to the present disclosure.

Please refer to FIG. 9, which shows a flowchart of a method of controlling the LED string control system according to the present disclosure, and also refer to FIG. 1 to FIG. 8. The method of controlling the LED string control system 100 is mainly to determine the digital logic of "0" or "1" by the voltage level of the signal, instead of the time width. The method includes steps of: adjusting a voltage level of a control signal to a first voltage level according to a first digital logic of a light command (S100). In one embodiment, a control module 3 adjusts a voltage level of the control signal Sc to a first voltage level VH (for example, but not limited to a high-level signal) according to the first digital logic H of the light command CL. Afterward, adjusting the voltage level of the control signal to a second voltage level according to a second digital logic of the light command (S200). In one embodiment, the control module 3 adjusts the voltage level of the control signal Sc to a second digital logic L of the light command CL (for example, but not limited to a low-level signal).

Afterward, adjusting the voltage level of the control signal based on the first digital logics and/or the second digital logics of the light command interlaced to each other to directly adjust the first voltage level to the second voltage level, or to directly adjust the second voltage level to the first voltage level (S300). Preferably, when the light command CL includes the first digital logics H and the second digital logics L which are interlaced to each other, the control module 3 directly adjusts the voltage level of the control signal from the first voltage level VH to the second voltage level VL based on the interlaced sequence, or directly adjusts the voltage level of the control signal from the second voltage level VL to the first voltage level VH based on the interlaced sequence. For example, the control module 3 can directly and continuously adjust the voltage level of the control signal Sc from the first voltage level VH to the second voltage level VL based on the successive occurrence of the first digital logics H and the second digital logics L, or can directly and continuously adjust the voltage level of the control signal Sc from the second voltage level VL to the first voltage level VH based on the successive occurrence of the second digital logics L and the first digital logics L.

Finally, adjusting the voltage level of the control signal to a third voltage level as a distinction voltage based on consecutive first digital logics and/or second digital logics (S400). Preferably, the control module 3 adjusts the control signal Sc to the third voltage level as the distinction voltage VI to distinguish the two consecutive first voltage levels VH once the first digital logics H of the light command CL appear consecutively. Similarly, the control module 3 adjusts the control signal Sc to the third voltage level as the distinction voltage VI to distinguish the two consecutive second voltage levels VL once the second digital logics L of the light command CL appear consecutively. In one embodiment, the detailed operations of steps (S100) to (S400) depend on the internal circuit structure of the LED string control system 100, which may be referred to FIG. 5A to FIG. 8, and the detailed description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light emitting diode (LED) string control system, comprising:

an LED string, comprising a plurality of LED modules, and a control module, coupled to the LED modules, and configured to provide a control signal to control the LED modules to generate lighting behavior based on a light command, wherein the light command is composed of a plurality of first digital logics and a plurality of second digital logics in a specific sequence; the control module respectively provides a plurality of first voltage levels and a plurality of second voltage levels to form the control signal based on the first digital logics and the second digital logics of the light command, wherein when the light command comprises the first digital logics and the second digital logics interlaced to each other, the control module directly adjusts the voltage level of the control signal from the first voltage level to the second voltage level or from the second voltage level to the first voltage level based on the interlaced sequence, wherein when the light command comprises consecutive first digital logics and/or consecutive second digital logics, the control module provides a third voltage level as a distinction voltage level for distinguishing two consecutive first voltage levels and/or two consecutive second voltage levels.

2. The LED string control system as claimed in claim 1, wherein the control module comprises:

a voltage generation apparatus, coupled to the LED string, and a controller, coupled to the voltage generation apparatus, and configured to control the voltage generation apparatus to adjust a DC voltage received by the LED string to the control signal based on the light command.

3. The LED string control system as claimed in claim 2, wherein the voltage generation apparatus comprises:

a first voltage generation circuit, coupled to the LED string and the controller, a second voltage generation circuit, coupled to the LED string and the controller, and a third voltage generation circuit, coupled to the LED string and the controller, wherein the controller controls the first voltage generation circuit to generate a first voltage to adjust the control signal to the first voltage level; the controller controls the second voltage generation circuit to generate a second voltage to adjust the control signal to the second voltage level; the controller controls the third voltage generation circuit to generate a third voltage to adjust the control signal to the distinction voltage level.

4. The LED string control system as claimed in claim 2, wherein the first voltage generation circuit comprises:

a first switch, coupled to the LED string and the controller, wherein the controller turns on the first switch to make a ground voltage as the first voltage so that a DC voltage received by the LED string is used as the first voltage level.

5. The LED string control system as claimed in claim 2, wherein the second voltage generation circuit comprises:

a first regulation component, coupled to the LED string, and a second switch, coupled to the first regulation component and the controller, wherein the first regulation component generates the second voltage due to the turned-on second switch controlled by the controller so as to adjust the control signal to the second voltage level that is equal to the DC voltage minus the second voltage.

6. The LED string control system as claimed in claim 3, wherein the second voltage generation circuit comprises:

a first voltage generation module, coupled to a node between the LED string and the first switch, and a first unidirectional conduction component, coupled to the node and the first voltage generation module, and configured for unidirectional conduction of a path from the node to the first voltage generation module, wherein the controller controls the first voltage generation module to generate the second voltage according to the second digital logics so as to adjust the control signal to the second voltage level that is equal to the DC voltage minus the second voltage.

7. The LED string control system as claimed in claim 3, wherein the third voltage generation circuit comprises:

a second regulation component, coupled to the LED string, and a third switch, coupled to the second regulation component and the controller, wherein the second regulation component generates the third voltage due to the turned-on third switch controlled by the controller so as to adjust the control signal to the distinction voltage level that is equal to a DC voltage received by the LED string minus the third voltage.

8. The LED string control system as claimed in claim 3, wherein the at least one LED module comprises:

a first capacitor, coupled to the at least one LED module in parallel, and configured to provide a first energy storage voltage to regulate the at least one LED module, wherein the third voltage generation circuit comprises:

a fourth switch, coupled to the LED string and a ground point, and a voltage of the ground point be as the third voltage, and a fifth switch, coupled to the LED string in parallel, wherein the controller turns on the fourth switch and the fifth switch according to consecutive first digital logics and/or consecutive second digital logics so as to adjust the control signal to the third voltage as the distinction voltage level.

9. The LED string control system as claimed in claim 3, wherein the third voltage generation circuit comprises:

a second capacitor, coupled to the LED string, a third switch, coupled to the second capacitor in parallel, and a resistor, coupled to the second capacitor, the sixth switch, and a ground point, wherein the second capacitor stores a second energy storage voltage when the sixth switch is turned off, and the controller turns on the sixth switch due to the distinction of two identical voltage levels so as to adjust the control signal to the distinction voltage level that is equal to a DC voltage received by the LED string plus the second energy storage voltage.

10. The LED string control system as claimed in claim 3, wherein the third voltage generation circuit comprises:

a second voltage generation module, coupled to a node between the LED string and the first switch, a second unidirectional conduction component, coupled to the node and the second voltage generation module, and configured for unidirectional conduction of a path from the node to the second voltage generation module, wherein the controller controls the second voltage generation module to generate the third voltage due to the distinction of two identical voltage levels so as to adjust the control signal to the distinction voltage level that is equal to the DC voltage minus the third voltage.

11. An LED module, configured to receive a control signal comprising a plurality of first voltage levels and a plurality of second voltage levels, and the LED module comprising:

an LED controller, configured to receive an input voltage required for operation through a positive end and a negative end, and receive the control signal through a signal-receiving end, and at least one LED, coupled to the LED controller, wherein the control signal is composed according to a specific sequence, and comprising a first voltage level with direct change in voltage level and a second voltage level with direct change in voltage, and a distinction voltage level for distinguishing two consecutive first voltage levels and/or two consecutive second voltage levels; when two consecutive first voltage levels and/or two consecutive second voltage levels are distinguished by the distinction voltage level, the LED controller correspondingly generates a drive command according to the first voltage levels and/or the second voltage levels, and controls the at least one LED to generate lighting behavior based on the drive command.

12. The LED module as claimed in claim 11, further comprising:

a signal output end, configured to provide the control signal received by the LED controller to an expansion module coupled to a rear end.

13. A method of controlling an LED string control system, configured to provide a control signal to control at least one LED module of an LED string to generate lighting behavior based on a light command, and the light command composed of a plurality of first digital logics and a plurality of second digital logics in a specific sequence, the method comprising steps of:

adjusting a voltage level of the control signal to a plurality of first voltage levels according to the first digital logics, adjusting the voltage level of the control signal to a plurality of second voltage levels according to the second digital logics, interlacedly sequencing the voltage level of the control signal based on the first digital logics and the second digital logics interlaced to each other, and directly adjusting the first voltage level to the second voltage level, or directly adjusting the second voltage level to the first voltage level, and adjusting the voltage level of the control signal to a third voltage level as a distinction voltage level for distinguishing the two consecutive first voltage levels and/or the two consecutive second voltage levels based on consecutive first digital logics and/or consecutive second digital logics.

* * * * *